C. E. SWENSON.
UNIVERSAL JOINT.
APPLICATION FILED JUNE 7, 1920.
1,380,270.
Patented May 31, 1921.
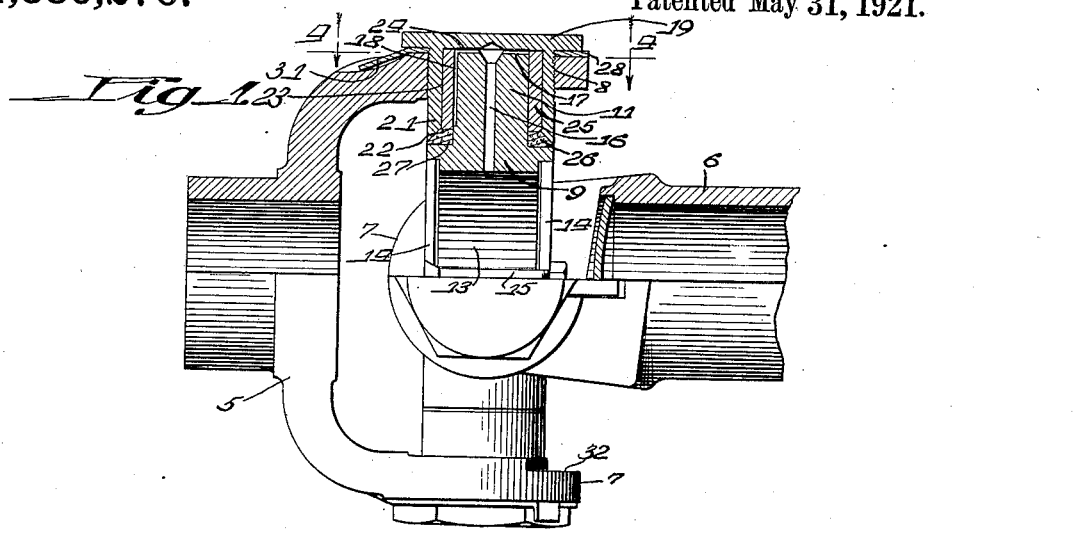
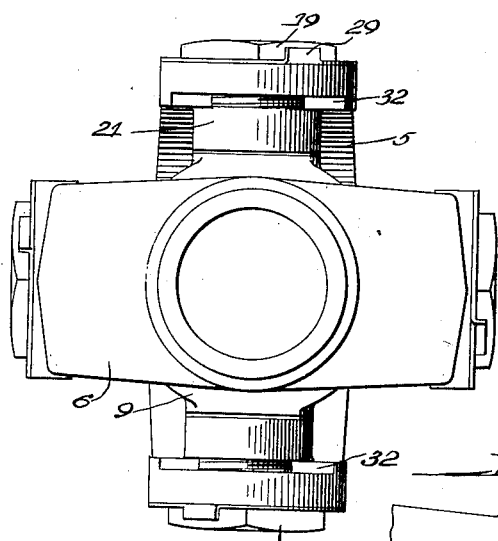
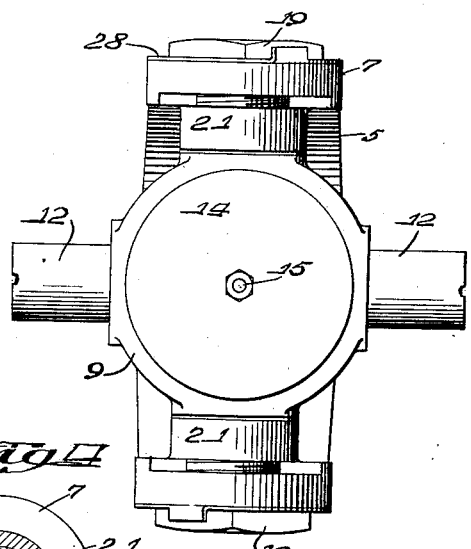
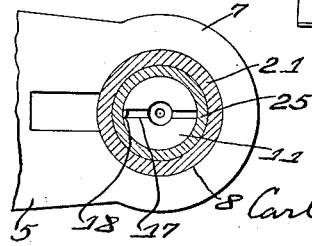
INVENTOR.
Carl E. Swenson
BY
ATTORNEY.

UNITED STATES PATENT OFFICE.

CARL E. SWENSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL L. ANDERSON, ALL OF ROCKFORD, ILLINOIS.

UNIVERSAL JOINT.

1,380,270.   Specification of Letters Patent.   Patented May 31, 1921.

Application filed June 7, 1920. Serial No. 387,024.

*To all whom it may concern:*

Be it known that I, CARL E. SWENSON, a citizen of the United States, residing at Rockford, in the county of Winnebago and State of Illinois, have invented certain new and useful Improvements in Universal Joints, of which the following is a specification.

This invention pertains to universal joints of the so-called trunnion type.

One of the objects of my invention is to provide a universal joint of generally improved and simplified construction, which shall comprise but comparatively few parts so designed as to secure most efficient radial and thrust bearings for the trunnions, which bearings shall be dust-proof and oil-tight.

Another object is to provide for lubricating the trunnion bearings, including a large capacity lubricant chamber and an oil-tight bearing structure, whereby the latter will be continuously lubricated throughout a comparatively long period of usage without requiring inspection or attention to this matter.

My invention also contemplates the provision of a universal joint of such simple and novel construction as to enable economical manufacture thereof, and which shall serve in a practical and efficient manner the service requirements.

In furtherance of these general objects, I have provided a universasl joint especially characterized by its trunnion coupling construction, the novel organization of which is very desirable as promoting economy and accuracy in manufacture and a high degree of efficiency in use.

Other objects and attendant advantages will be appreciated by those familiar with this art as the invention becomes better understood by reference to the following specification when considered in connection with the accompanying drawing, in which—

Figure 1 is a side elevation partly in section, of a universal joint embodying my invention;

Fig. 2, an end view of the joint;

Fig. 3, a view looking at the trunnion block end of the joint with one of the coupling yokes removed; and Fig. 4, a detail section taken substantially on the line 4—4 of Fig. 1.

Universal joints of the type to which the present invention relates are characterized by the inclusion of a pair of terminal coupling members, a transmission member, and trunnion connections between the coupling members and transmission member generally arranged on axes intersecting at right angles and allowing for the necessary relative movement between the coupling members when the same are in disalined relation. In joints of this type the trunnions may be carried either by the transmission member or by the terminal coupling members; and in the present illustration of my invention, I have taken as an example the former type, that is, in which the trunnions form part of the transmission member or block. It should be understood, therefore, that the present invention contemplates the use of my improved trunnion connector structure in either of the aforesaid types by reason of the fact that the novel organization of parts is the same in both instances.

Referring now to Fig. 1, it will be observed that the terminal coupling members designated generally by characters 5 and 6 are each in the form of a yoke, the terminal ends 7 of which have alined threaded openings 8. The transmission member or block referred to generally by character 9, is in the present type preferably in the form of a forging having pairs of alined trunnions 11 and 12 on axes intersecting at right angles. The transmission member has a hollow interior providing a lubricant chamber 13 closed at its sides by plates 14, which are secured in position by the central bolt 15. This chamber 13 is adapted to be filled with a suitable lubricant such as thin grease or heavy oil of the proper consistency to feed outwardly through the passage 16 through each trunnion to the grooves 17 and 18 respectively arranged across the end and lengthwise along the periphery of the trunnion.

The connection between each trunnion and its respective terminal arm being similar, a description of one will suffice. As shown in Fig. 1, there is threadingly engaged in the opening 8 of the terminal arm a bearing cap 19 having a head suitably shaped to be engaged by a wrench or an equivalent tool for tightening and loosening the cap and having an externally threaded shank 21, the end 22 of which may be tapered as shown, and forming a socket having a finished internal cylindrical wall 23 and end wall 24. This cap is preferably formed of steel but is not hardened; consequently, there will be no distortion of the threads as is frequently found in universal joint structures in which it is necessary to harden threaded members. The cap 19 carries a bearing bushing 25 which is preferably a steel part hardened by a suitable process and then ground on its outer and inner peripheries to a high degree of accuracy, so as to provide a most efficient bearing for the trunnion 11 and to enable the desired press-fit of the bushing in the cap socket 23. A packing 26 of suitable material, such for example as cork or felt, is now interposed between the inner ends of the bushing 25, the beveled end 22 of the shank and the shoulder 27 of the transmission member. A suitable nut lock 28 having clips 29 and 31 respectively engaging the head of the cap and a recess in the terminal arm, serves to lock the cap in operative position. For insertion of the trunnions into the threaded openings 8 when assembling the joint, I have cut the inner edges of the arms 7 away at 32 to allow clearance for the following trunnion to enter its respective opening. After the trunnions are inserted the bearing caps are applied and secured in position.

It will be observed that the outer end of the trunnion bears against the end 24 of the socket in the cap 19 so that the end thrust of the trunnion is borne at the outer end thereof rather than by an inner shoulder. Only a single packing is required to secure absolutely oil and dust tight bearings, and this packing is arranged at the inner end of the radial bearing about the trunnion and is effected by drawing the cap tight, it being noted that by employing a packing of sufficient thickness, the cap serves to compress the packing so as to secure a very tight joint. It will be further observed that by reason of the novel organization of parts, the trunnion had radial and thrust bearing against appropriate surfaces, and that the parts may be secured in position without binding and distortion by reason of the fact that the cap does not require hardening by heat treatment processes which would invariably distort the threads. Another advantage following from this combination is that the outer ends of the trunnions may be ground very quickly and accurately between opposed abrasive members as distinguished from grinding shoulders at the inner ends of the trunnions, which latter operation is not only difficult to perform but requires considerably more time, and variations in dimensions are very apt to occur. Under the present method the outer surfaces of the terminal arms 7 may be accurately finished in a simple operation, so that the dimension between these faces and the dimension between the outer ends of the trunnions bear the same relation. It follows, therefore, that when the parts are assembled and the bearing cap drawn to position, a very efficient connection is established between the terminal coupling members and transmission member, the radial and thrust bearing surfaces of which will be continuously lubricated from the lubricant chamber. It will be evident from the foregoing that a trunnion bearing embodying my invention has ample radial and thrust surfaces for the maximum load requirements and that such surfaces may be very accurately finished, so that with proper lubrication and exclusion of foreign matter as provided herein, the bearings will be very efficient and will not require attention for a comparatively long period, and that the parts are so designed as to enable manufacture and assembly at a comparatively low cost.

It is believed that the foregoing conveys a clear understanding of the objects prefaced above, and while I have illustrated but a single working example of my invention, it should be understood that the same might be embodied in various different arrangements of the terminal coupling members and transmission member, and that the shape and proportions of parts might be changed without departing from the spirit and scope of the invention as expressed in the appended claims, in which—

I claim:

1. In a universal joint, a trunnion connector comprising an externally threaded socket member having a threaded connection with one of the members of the joint, a hardened bearing bushing ground on its inner and outer peripheries and having a press-fit in the socket of said threaded part, the trunnion having a radial bearing in said bushing and a thrust bearing at its outer end against said socket member, and means for lubricating the radial and thrust bearings.

2. In a universal joint of the trunnion type, the combination with terminal coupling members and a transmission member, of a trunnion-connector comprising a socket member for each trunnion having a nonhardened threaded portion threadingly engaged in one of the joint members and having a hardened radial bearing surface, a trunnion in said socket member having radial bearing against said hardened surface and having a thrust bearing at its outer end, a packing for the inner end of said radial bearing, and means for lubricating said radial and thrust bearings.

3. In a universal joint of the trunnion type, the combination with terminal coupling members and a transmission member, of trunnion connections between said members comprising connector-units adapted to be independently screwed into position, each unit comprising a bearing cap having an externally threaded shank and a socket having a finished internal wall and an end thrust wall, the cap not being hardened after cutting the threads, and a hardened bushing ground on its inner and outer peripheries to dimensions necessary for a press-fit in said socket and for furnishing an accurate radial thrust bearing, means for providing for lubrication for the radial and end thrust bearings, and packing for the inner end of each radial bearing.

CARL E. SWENSON.